8883X
J. Page,
Mortising Machine.
Patented June 12, 1835.
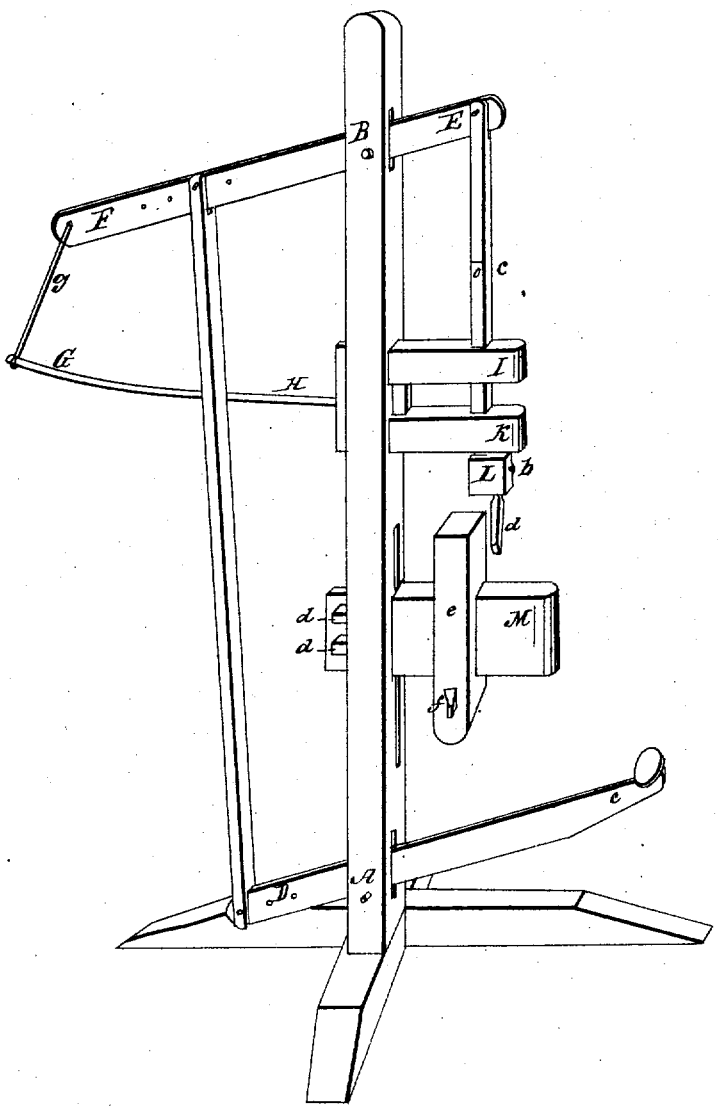
AM. PHOTO-LITHO. CO. N.Y. (OSBORNE'S PROCESS)

Jonathan Page (June 12, 1835)
Letters Patent 8883X

The Schedule referred to in these Letters Patent and making part of the same containing a description in the words of the said Jonathan Page himself of his improvement in the Mortising machine. To all to whom these presents shall come Be it known that I Jonathan Page of Hopkinton in the County of Merrimack & State of New-Hampshire have invented a new and useful improvement in the mortising machine and that the following is a full and exact description of the construction and operation of the same as improved by me. The said machine consists of a piece of timber fixed perpendicularly six or seven feet high and six inches wide by three inches thick through which eight inches from the bottom is inserted a lever and another five and three fourths feet above it represented by the lines C.D. and E.F. upon the drawing accompanying this specification. These levers are each about thirty inches long and are fixed at A. (and B. by bolts of wood or iron which form their axes. They are connected at D. (and F. by a shaft of wood one and a fourth by two inches square, which is attached by a mortice to the lower lever at a distance of eight inches from its axis. and to the upper one at a distance of eighteen inches. These distances may however be varied and the force produced varied accordingly— To the end E. of the upper lever eight inches from its axis is attached the shaft or handle of the chisel. this is of wood two by one and a fourth inches square at the upper end and thirty four inches long and passes through mortises fitted for the purpose in two pieces of timber one under the other projecting horizontally from the perpendicular timber about ten inches. They are each three inches square and at a distance of three inches apart. the upper one being eighteen inches from the upper lever. These pieces serve to guide the shaft of of the chisel. A sufficient play is afforded it by means of a joint near
the middle of the shaft. The lower part of it, four inches above the
bottom is three inches square. and contains either a round or square
socket for receiving a chisel which may be any common chisel
having the handle suited to [illegible] socket and is turned and fasten-
ed by means of a spring or screw, inserted in the side of said shaft,
A frame for receiving the wood to be mortised projects from the
main timber under the chisel fitted with a sliding tenant in
said timber so as to be raised or lowered according to the size of
the piece to be mortised. Said frame consists of a horizontal
piece or rest at right angles to which and fitted upon it by a mor
tise is a perpendicular piece serving as a guard which may be moved
back and forward as occasion may require and is fastened by a
key or wedge at the bottom. The piece to be mortised is held
and moved upon the frame by the hands or a carriage fitted for
the purpose of confining it. When wheel hubs or similar work
is to be mortised the carriage is used. The machine operates by
bringing down the end C. of the lever C.D. by application of
the foot or some other power. whereby the shaft containing the
chisel is driven forcibly down by the lever E.F. and restored
to its place by means of the spring projecting from the main
timber represented by G.H. upon the drawing accompanying
this specification. A cord or wire is fastened from the end of the
spring: which may be of wood or steel to the end of the lever
E.F. and restores it to its place when the foot or other power is
removed from C. Your petitioner claims as his invention and im
provement the construction of the frame for receiving the piece
to be mortised. with a movable rest and guard different from
any in use. whereby materials of different sizes may be more
conveniently mortised and wheel hubs in particular of all sizes
are mortised by the use of a cheap and simple carriage for con
fining them. He also claims as an improvement made
by himself the use of common chisels in the operation of his machine and 8883X 445 and the cheap and simple construction of the whole. In testimony that the above and foregoing is a true specification of my said improvement as above described I have hereto set my hand this fourteenth day of May Anno Domini 1835.

Witness

Jonathan Page

Saml Smith

Daniel C Gould

Drawing 840 wds]

Exp Rec